United States Patent
Moyer et al.

(10) Patent No.: US 7,130,943 B2
(45) Date of Patent: Oct. 31, 2006

(54) DATA PROCESSING SYSTEM WITH BUS ACCESS RETRACTION

(75) Inventors: William C. Moyer, Dripping Springs, TX (US); Jimmy Gumulja, Austin, TX (US); Brett W. Murdock, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/954,809

(22) Filed: Sep. 30, 2004

(65) Prior Publication Data

US 2006/0069830 A1   Mar. 30, 2006

(51) Int. Cl.
G06F 13/00 (2006.01)
G06F 3/00 (2006.01)
G06F 13/36 (2006.01)

(52) U.S. Cl. ............ 710/107; 710/39; 710/40; 710/41; 710/110; 710/116; 710/118

(58) Field of Classification Search ............ 710/39–45, 710/107–125, 305–317
See application file for complete search history.

(56) References Cited

U.S. PATENT DOCUMENTS

| | | | | |
|---|---|---|---|---|
| 4,620,278 A | * | 10/1986 | Ellsworth et al. | 710/119 |
| 4,987,529 A | * | 1/1991 | Craft et al. | 710/113 |
| 5,021,950 A | * | 6/1991 | Nishikawa | 710/119 |
| 5,297,292 A | * | 3/1994 | Morimoto et al. | 710/113 |
| 5,553,247 A | * | 9/1996 | Lallement | 710/113 |
| 2002/0144054 A1 | * | 10/2002 | Fanning et al. | 711/108 |
| 2003/0088717 A1 | * | 5/2003 | Baas | 710/1 |

FOREIGN PATENT DOCUMENTS

GB   2166930 A   *  5/1986

OTHER PUBLICATIONS

M-CORE M210 Specification, Version 1.5; Feb. 17, 1999; 2pp (Cover & Preface); pp. iii-xiv (Table of Contents), pp. 159-210; Motorola Inc., USA.
AMBA™ Specification (Rev 2.0); May 13, 1999; pp. i-xii; pp. 1-1 to 1-14; pp. 2-1 to 2-8, pp. 3-1 to 3-58; ARM.

* cited by examiner

Primary Examiner—Rehana Perveen
Assistant Examiner—Faisal Zaman
(74) Attorney, Agent, or Firm—Joanna G. Chiu

(57) ABSTRACT

A bus master may selectively retract a currently pending access based on one or more characteristics of the currently pending access. In this manner, bus master may better control its access requests. The one or more characteristics may include, for example, type of access (e.g. read/write, instruction/data, burst/non-burst, etc.), sequence or order of accesses, address being accessed (e.g. which address range is being accessed or which device is being accessed), the bus master requesting retraction (in an, e.g., multimaster system), or any combination thereof. A bus arbiter may also selectively retract currently pending access requests in favor of a subsequent access request based on one or more characteristics of the currently pending access request or the subsequent access request. These characteristics may include any of those listed above, priorities of the requesting masters (e.g. a priority delta between requesting masters), other attributes of the requesting masters, or any combination thereof.

41 Claims, 7 Drawing Sheets

FIG. 3

ACCESS RETRACTION CONTROL REGISTERS 48

| INSTRUCTION READ RETRACTION CONTROL FIELD 100 | DATA READ RETRACTION CONTROL FIELD 102 | DATA WRITE RETRACTION CONTROL FIELD 104 |
|---|---|---|

FIG. 4

ACCESS RETRACTION CONTROL REGISTERS 48

| ADDRESS RANGE 1 RETRACTION CONTROL FIELD 106 | ADDRESS RANGE 2 RETRACTION CONTROL FIELD 108 | ADDRESS RANGE 3 RETRACTION CONTROL FIELD 110 | ADDRESS RANGE 4 RETRACTION CONTROL FIELD 112 |
|---|---|---|---|

FIG. 5

ACCESS RETRACTION CONTROL REGISTERS 48

| INSTRUCTION FOLLOWING INSTRUCTION (IFI) RETRACTION CONTROL FIELD 114 | DATA READ FOLLOWING INSTRUCTION (DRFI) RETRACTION CONTROL FIELD 116 | DATA WRITE FOLLOWING INSTRUCTION (DWFI) RETRACTION CONTROL FIELD 118 | INSTRUCTION FOLLOWING DATA READ (IFDR) RETRACTION CONTROL FIELD 120 | DATA READ FOLLOWING DATA READ (DRFDR) RETRACTION CONTROL FIELD 122 | DATA WRITE FOLLOWING DATA READ (DWFDR) RETRACTION CONTROL FIELD 124 | INSTRUCTION FOLLOWING DATA WRITE (IFDW) RETRACTION CONTROL FIELD 126 | DATA READ FOLLOWING DATA WRITE (DRFDW) RETRACTION CONTROL FIELD 128 |
|---|---|---|---|---|---|---|---|

| MASTER 0 PRIORITY FIELD 230 | MASTER 1 PRIORITY FIELD 232 | MASTER 2 PRIORITY FIELD 234 |
|---|---|---|

← MASTER PRIORITY REGISTER 210

FIG. 8

| PARKING ENABLE FIELD 236 | PARKING MASTER FIELD 238 |
|---|---|

← PARKING CONTROL REGISTER 212

FIG. 9

| MASTER 0 PRIORITY DELTA RETRACTION CONTROL FIELD 240 | MASTER 1 PRIORITY DELTA RETRACTION CONTROL FIELD 242 | MASTER 2 PRIORITY DELTA RETRACTION CONTROL FIELD 244 |
|---|---|---|

← ACCESS RETRACTION CONTROL REGISTER 214

FIG. 10

| HIGHEST PRIORITY MASTER RETRACTION CONTROL FIELD 246 | DELAY RETRACTION CONTROL FIELD 248 | PARKING MASTER RETRACTION CONTROL FIELD 250 | NON-PARKING MASTER(S) RETRACTION CONTROL FIELD 252 |
|---|---|---|---|

← ACCESS RETRACTION CONTROL REGISTER 214

FIG. 11

DATA PROCESSING SYSTEM WITH BUS ACCESS RETRACTION

RELATED APPLICATION

This is related to U.S. Patent Application having Ser. No. 10/955,558, entitled "DATA PROCESSING SYSTEM WITH BUS ACCESS RETRACTION," by William C. Moyer et al., filed on even date, and assigned to the current assignee hereof.

FIELD OF THE INVENTION

The present invention relates to a data processing system, and more particularly, to a data processing system with bus access retraction.

RELATED ART

Different data processing systems may operate under various different bus protocols, where these bus protocols may define, for example, how access requests made by a bus master are treated. Also, different data processing systems may operate using different bus arbitration schemes which also defines how requests from different bus masters are treated. These bus protocols and bus arbitrations may be inflexible in many aspects, such as with respect to access retraction, which often introduces undesired latencies. These latencies may be especially problematic for high priority bus masters within a data processing system. Furthermore, errors may occur when attempting to integrate systems operating according to different bus protocols and bus arbitration schemes which, for example, treat access retractions differently.

Therefore a need exists for a data processing system having improved access retraction schemes which may allow, for example, for a more efficient bus protocol or arbitration scheme with reduced latency.

BRIEF DESCRIPTION OF THE DRAWINGS

The present invention is illustrated by way of example and not limited by the accompanying figures, in which like references indicate similar elements, and in which:

FIGS. 3–5 illustrate, in block diagram form, various embodiments of access retraction control register of FIG. 2;

FIG. 8 illustrates, in block diagram form, one embodiment of master priority register of FIG. 7;

FIG. 9 illustrates, in block diagram form, one embodiment of parking control register of FIG. 7;

FIGS. 10–11 illustrate, in block diagram form, various embodiments of access retraction control register of FIG. 7.

Figure 1:
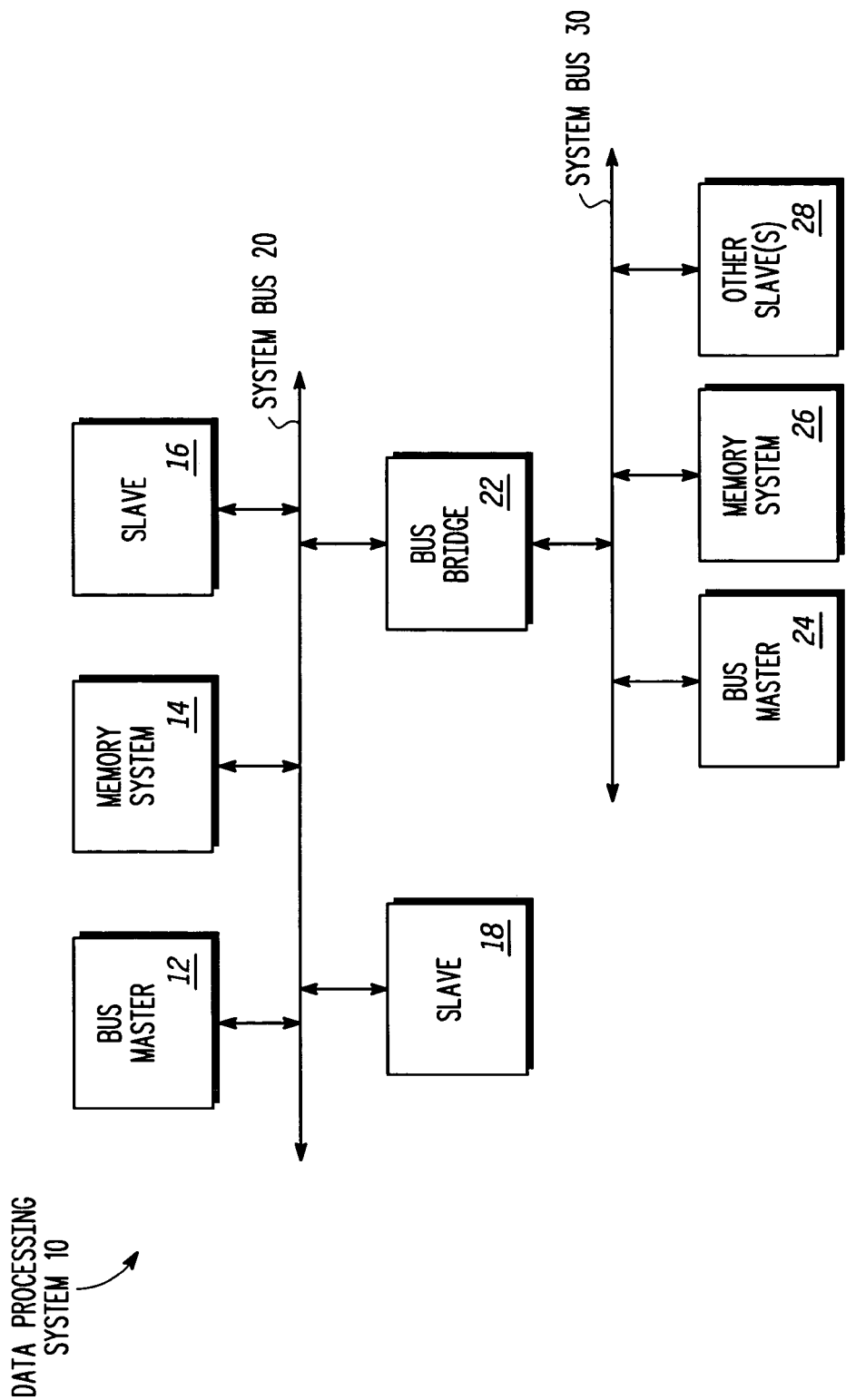
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

One embodiment of the present invention provides for selectively overriding a bus protocol, based on, for example, characteristics of a currently pending bus access request. One embodiment provides for selective retraction of a currently pending access request, based on, for example, characteristics of the currently pending access request. An alternate embodiment provides for selective retraction of a currently pending access request, based on, for example, characteristics of a newly requested access provided subsequent to the currently pending access request. (Alternatively, selective retraction may be based on characteristics of both the currently pending access request and a subsequent access request.) In one embodiment, the characteristics of the currently pending access request used to selectively allow overriding of the bus protocol or retraction of the currently pending access request may include an address range corresponding to the requested bus access, a type of access (e.g. read/write, instruction/data) of the requested bus access, a sequence of accesses corresponding to the requested bus access, the bus master of the requested bus access, or combinations thereof.

The illustrations and descriptions of FIGS. 1–6 will provide an example of a data processing system which allows for selective retraction of a currently pending bus access request by the requesting bus master. An access may be currently pending on system bus 20 awaiting the completion of a current access on system bus 20. In some embodiments, the currently pending access request is not actually made active until the current access in progress on system bus 20 completes. System bus 20 may implement a bus protocol in which address and data phases of the bus operation are overlapped, such that the address bus is driven for a subsequent access request (the "currently pending" access request) while awaiting the return of data for a current access in progress. Once the current access in progress completes, which may take multiple clock cycles, its data phase ends, and the address which was driven at the termination of that data phase (referred to as the currently pending access request) becomes the new current access, and the address bus may then be driven with a new access request. The address and data phases are thus overlapped, with the currently pending access request becoming the new "current" access request at the data phase termination boundary. In some cases, retraction of a currently pending bus access request on system bus 20 may be desired by a bus master if the bus master knows that the currently pending bus access request will not be used or is no longer needed. In this manner, stalls due to bus access requests which become unnecessary or are to be discarded may be reduced. Therefore, in one embodiment, a bus master may selectively retract a currently pending access request based on characteristics of the currently pending access request as will be described in reference to FIGS. 1–6.

For example, FIG. 1 illustrates a data processing system in which the bus master performs sequential prefetching of instructions into its pipeline. This sequential access pattern, though, may be disrupted by change of flow instructions, such as, for example, branch instructions. When a change of flow is detected, the bus master will switch the instruction prefetch stream to the target of the change of flow (e.g. the target of a branch instruction). Therefore, in this case, a currently pending access request of the bus master on a system bus may correspond to a sequential address following the change of flow instruction, which, due to the change of flow to the target instruction, is no longer needed by the bus master. Therefore, the bus master may want to retract this now unneeded currently pending access request. Based on characteristics of this currently pending access request (which may, for example, may be compared to control information stored within access retraction control registers), it can be determined whether retraction of the currently pending access request is allowed. If allowed, the bus master retracts the currently pending access request, thus reducing latency.

FIG. 1 illustrates one embodiment of a data processing system 10. Data processing system 10 includes a system bus 20, a bus master 12, a memory system 14, a bus slave 16, a bus slave 18, a bus bridge 22, a bus master 24, a memory system 26, other slave(s) 28, and a system bus 30. Bus master 12, bus slave 16, bus slave 18, memory system 14, and bus bridge 22 are all bidirectionally coupled to system bus 20. Bus bridge 22, bus master 24, memory system 26, and other slave(s) 28 are all bidirectionally coupled to system bus 30. Although only two slaves 16 and 18 are illustrated in FIG. 1, data processing system 10 may include any number of slaves coupled to system bus 20. Similarly, any number of bus masters and memory systems may also be coupled to system bus 20. Also, any number of bus masters, slaves, and memory systems may be coupled to system bus 30 and are not limited to those shown in FIG. 1.

In one embodiment, bus master 12 may be a processor, such as a microprocessor, digital signal processor, etc., or may be any other type of master device, such as a direct memory access (DMA) unit. Slaves 16 and 18 may be any type of slave device, such as, for example, a memory accessible by bus master 12, or a peripheral such as, for example, a universal asynchronous receiver transmitter (UART), a real time clock (RTC), a keyboard controller, etc. Memory system 14 may be any type of memory system, such as, for example, random-access-memory (RAM) and may include a memory controller coupled to storage circuitry for storing data and instructions.

In operation, bus master 12 places access requests onto system bus 20 which request access to other devices coupled to system bus 20, such as, for example, memory system 14, slave 16, or slave 18, or to bus master 24, memory system 26, or other slave(s) 28 via bus bridge 22. Bus bridge 22 allows for the interfacing of system bus 20 and system bus 30 such that bus master 12 may also access devices residing on system bus 30. In one embodiment, system bus 20 operates according to a different bus protocol than system bus 30. Bus bridge 22 operates as known in the art and therefore will not be described in more detail herein. Similarly, the same examples provided above for bus master 12, memory system 14, and slaves 16 and 18 apply to bus master 24, memory system 26, and other slave(s) 28, respectively.

Figure 2:
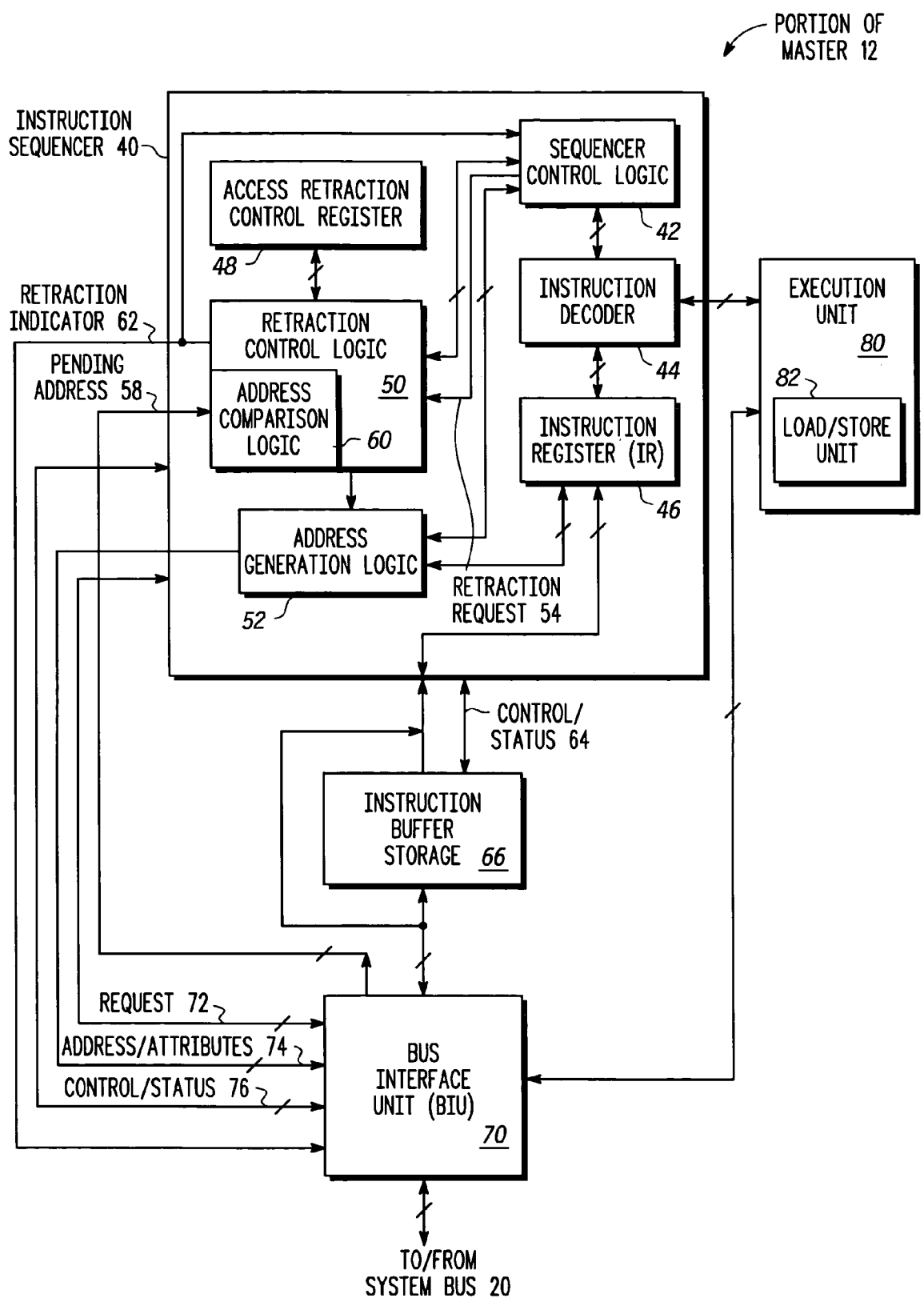
FIG. 2 illustrates, in block diagram form, a portion of a bus master of FIG. 1, in accordance with one embodiment of the present invention.

FIG. 2 illustrates a portion of bus master 12 in accordance with one embodiment of the present invention. Bus master 12 includes an instruction sequencer 40, instruction buffer storage 66, a bus interface unit (BIU) 70, and an execution unit 80. BIU 70 provides information to and from system bus 20, and is bidirectionally coupled to instruction buffer storage 66 and instruction sequencer 40. Instruction buffer storage 66 is bidirectionally coupled to instruction sequencer 40. Instruction sequencer 40 includes an instruction register (IR) 46, an instruction decoder 44, sequencer control logic 42, access retraction control register 48, retraction control logic 50, and address generation logic 52. IR 46 is coupled to address generation logic 52 and to instruction decoder 44, which is coupled to sequencer control logic 42. Sequencer control logic 42 is coupled to retraction control logic 50 and address generation logic 52, and retraction control logic 50 is coupled to address generation logic 52 and to access retraction control register 48. Execution unit 80 is coupled to instruction decoder 44 and BIU 70, and includes a load/store unit 82.

In operation, instruction sequencer 40 controls prefetching and fetching of instructions and data from, for example, memory system 14 (or other slaves) via BIU 70. For example, instructions may be prefetched into instruction buffer storage 66, while data may be fetched or prefetched and provided, via BIU 70, to execution unit 80 (e.g. load/store unit 82). IR 46 receives the next instruction to be decoded from instruction buffer storage 66 and provides it to instruction decoder 44, which decodes the instruction. The instruction is then provided to execution unit 80 for execution and further processing of the instruction. Processing of an instruction after decode is well known in the art, and therefore will not be described in more detail herein. That is, execution unit 80, including load/store unit 82, operate as known in the art.

Sequencer control logic 42 controls the prefetching and fetching of instructions into instruction buffer storage 66. For example, sequencer control logic 42 indicates to address generation logic 52 which addresses (and corresponding attributes) to generate to BIU 70 via address/attributes 74. For example, in one embodiment, sequencer control logic 42 indicates to address generation logic 52 to sequentially prefetch instructions starting at a particular location. Therefore, BIU 70 receives addresses to be prefetched via address/attributes 74 from address generation logic 52. Address generation logic 52 asserts request 72 to indicate to BIU 70 that an address and corresponding attributes are present on address/attributes 74, and BIU 70 may return handshaking signals via request 72 to instruction sequencer 40. In one embodiment, BIU 70 includes an address queue (not shown) in which addresses and attributes received via address/attributes 74 are placed until system bus 20 is available for receiving an access request corresponding to the next address in the address queue. BIU 70 provides pending address 58 to instruction sequencer 40 to indicate to instruction sequencer 40 (and to retraction control logic 50) the address corresponding to the access request which is currently pending (awaiting activation when the current data phase of the bus completes) on system bus 20. Pending address 58 may therefore be an earlier address than the most recent address provided via address/attributes 74 to BIU 70. Note that hand shaking controls and other control or status information may be communicated between BIU 70 and instruction sequencer 40 via CTL/STATUS 76 and/or request 72.

Note that, in one embodiment, sequencer control logic may also be used to control prefetching and fetching of data which is provided by BIU 70 to execution unit 80. For example, if a load or store instruction is decoded by instruction decoder 44, address generation logic 52 may generate the appropriate address from/to which to read/write the data, or may receive the corresponding address from load/store unit 82. This address may also be provided to BIU 70 via address/attributes 74. Also, sequencer control logic 42 may indicate to address generation logic 52 to prefetch data from a series of locations.

Upon sequencer control logic 42 detecting a change of flow, such as, for example, by detecting a branch instruction, sequencer control logic 42 switches the instruction prefetch steam to the target of the change of flow. That is, sequencer control logic 42 indicates to address generation logic 52 to generate prefetch addresses beginning at the target address, where address generation logic 52 may calculate the target address based on information provided from IR 46. The generated addresses are provided to BIU 70 which provides the instructions from the new instruction prefetch stream to instruction buffer storage 66. In one embodiment, the instructions from the new instruction prefetch stream overwrite previously existing instruction such that IR 46 and instruction decoder 44 operate on the correct instructions. Also, note that, in one embodiment, if instruction buffer 66 is empty, data (including fetched or prefetched instructions) may be provided directly to IR 46, thus bypassing instruction buffer 66. Also, handshaking and other status and/or control information may be communicated between instruction sequencer 40 and instruction buffer storage 66 via control/status 64.

Sequencer control logic 42, based on the current instruction decoded by instruction decoder 44, may determine that the currently pending access request on system bus 20 (corresponding to pending address 58) should be retracted. For example, in the case of a change of flow, a currently pending prefetch access request is known not to be needed because the instructions will now be fetched starting from the new target address. If that currently pending access request is allowed to be completed first, master 12 will stall since the target of the change of flow instruction cannot be accepted and activated until the currently pending prefetch request (which is to be discarded) completes. In another example, sequencer control logic 42 may wish to allow a data access to take priority over an instruction prefetch. In this example, if the currently pending access request is an instruction prefetch request, sequencer control logic 42, upon detection of an instruction requiring a data access being decoded by instruction decoder 44, may want to retract the currently pending access request (i.e. the instruction prefetch request) so that the data access may be performed sooner.

If sequencer logic 42 wishes to retract the currently pending access request on system bus 20 (corresponding to pending address 58), sequencer control logic 42 asserts retraction request 54 indicating to retraction control logic 50 that the currently pending access request should be retracted. In one embodiment, retraction control logic 50, using access retraction control information stored within bus master 12 (for example, stored within access retraction control register 48), determines whether retraction of the currently pending access request is allowed based on characteristics of the currently pending access request. These characteristics may include, for example, the address corresponding to the currently pending access request (e.g. pending address 58), type of access (e.g. read/write, instruction/data, burst/non-burst, etc.), sequence or order of access, address being accessed (e.g. which address range is being accessed or which device is being accessed), the bus master requesting retraction (in an, e.g., multimaster system), or any combination thereof. For example, in one embodiment, the information stored within access retraction control register 48 may correspond to particular address ranges. That is, the information provided to retraction control logic 50 may depend on the address of the currently pending access request. In this embodiment, address comparison logic 60 may be used to compare pending address 58 (corresponding to the currently pending access request) to various address ranges. Access retraction control register 48, address comparison logic 60 and the address ranges, and the characteristics of the currently pending access request used to allow or disallow a retraction request will be discussed in more detail below in reference to FIGS. 3–5.

In another embodiment, retraction control logic 50, using access retraction control information stored within bus master 12 (for example, stored within access retraction control register 48), determines whether retraction of the currently pending access request is allowed based on characteristics of a newly requested access which is subsequent to a currently pending access request. These characteristics may include, for example, the address corresponding to the new access request, type of access (e.g. read/write, instruction/data, burst/non-burst, etc.), sequence or order of access, address being accessed (e.g. which address range is being accessed or which device is being accessed), the bus master requesting retraction (in an, e.g., multimaster system), or any combination thereof. For example, in one embodiment, the information stored within access retraction control register 48 may correspond to particular address ranges. That is, the information provided to retraction control logic 50 may depend on the address of the new access request. In this embodiment, address comparison logic 60 may be used to compare the newly requested address to various address ranges. As mentioned above, access retraction control register 48, address comparison logic 60 and the address ranges, and the characteristics of the currently pending access request used to allow or disallow a retraction request will be discussed in more detail below in reference to FIGS. 3–5. However, note that the descriptions provided for FIGS. 3–5 in reference to the currently pending access request would also apply analogously to a subsequent access request.

Referring back to FIG. 2, if retraction control logic 50 determines that the retraction is allowed, retraction control logic 50 asserts retraction indicator 62 to notify BIU 70 that the currently pending access request on system bus 20 is to be retracted. In one embodiment, the currently pending access request is retracted by displacing or replacing the currently pending access request with a new access request to system bus 20. This new access request may be, for example, the next access request waiting within the address queue of BIU 70, which was discussed above, or may be a newly generated request supplied to BIU 70. In an alternate embodiment, BIU 70 may retract the currently pending access request by immediately returning a predetermined value to instruction buffer storage 66. This predetermined value can be any dummy value, since it will be discarded. In this manner, the currently pending access request is quickly completed and the next access request can be initiated, without stalling master 12. Other alternate embodiments may use other methods to retract the currently pending access request. In some embodiments, no value is returned to instruction buffer storage 66.

If, however, retraction control logic 50 does not allow retraction of the currently pending access request, retraction control logic 50 does not assert (i.e. it negates, or continues to negate) retraction indicator 62. In this case, master 12 waits until the currently pending access request is completed before proceeding with the new instruction prefetch stream due to the change of flow. Retraction control logic 50 may also indicate to address generation logic 52 that retraction was not allowed.

Therefore, note that in one embodiment, access retraction control register 48 and retraction control logic 50 may be used to selectively override a bus protocol in order to, for example, reduce or prevent stalls. In one embodiment, the bus protocol of system bus 20 may require that an existing prefetch access request which has been initiated and is currently pending on system bus 20 must be allowed to complete, even though it may be discarded upon completion. For example, in the case of a change of flow, a currently pending prefetch access request is known not to be needed because the instructions will now be fetched starting from the new target address. However, the bus protocol of system bus 20 may still require that the currently pending prefetch on system bus 20 be completed, causing master 12 to stall. As described above, though, sequencer control logic 42 may request that the currently pending access request be retracted to prevent this stalling. In this case, retraction control logic 50, based on the information stored within the access retraction control registers and on characteristics of the currently pending access request, may selectively override the bus protocol by retracting the currently pending access request and not letting it complete as it normally would. Therefore, in the cases in which retraction is allowed, the bus protocol is overridden to prevent the stall. In other embodiments, other aspects of a bus protocol may be overridden using different types of overriding control registers.

Figure 6:
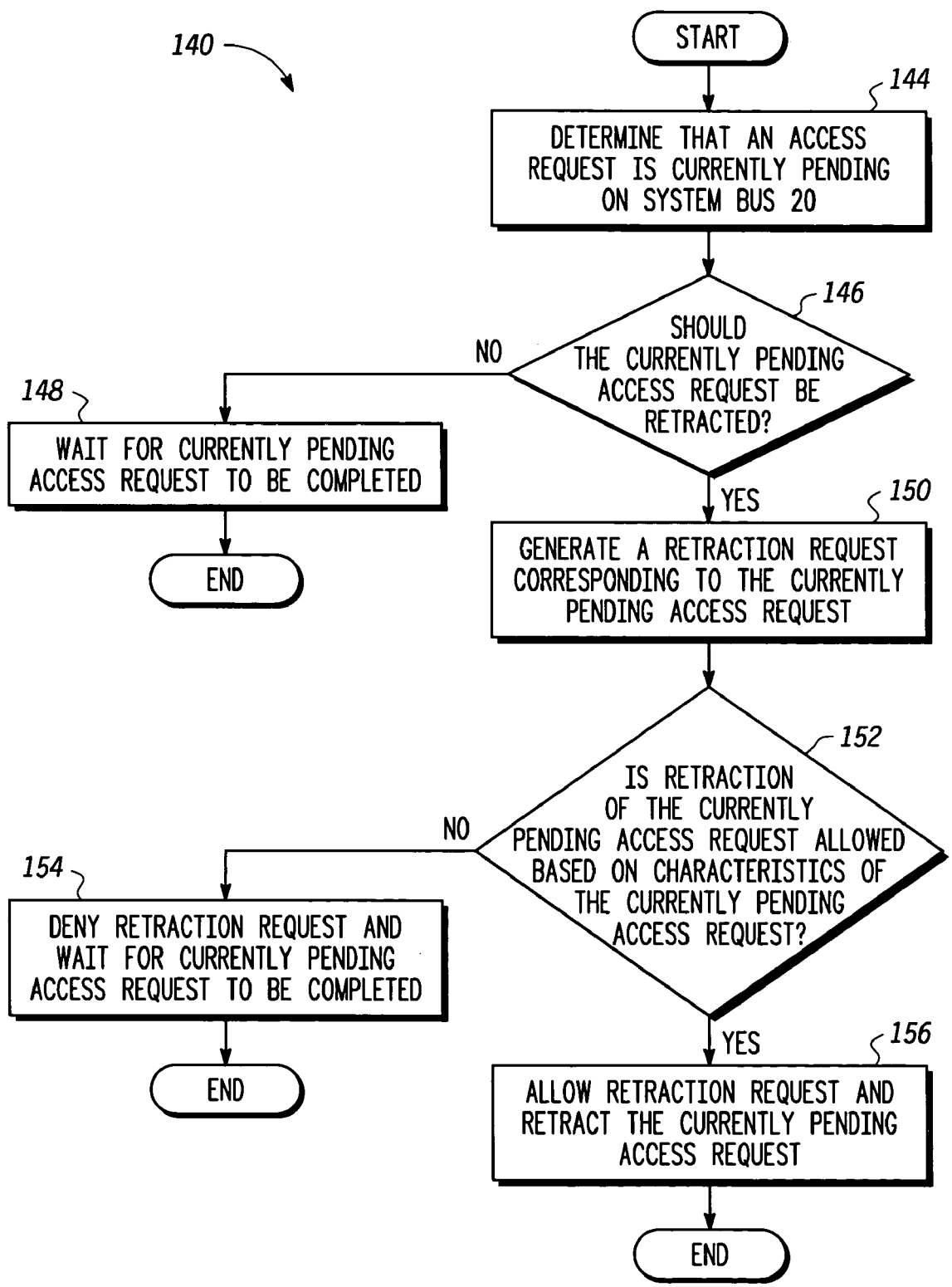
FIG. 6 illustrates, in flow diagram form, a method for performing selective access retraction in accordance with one embodiment of the present invention.

Retraction of the currently pending access request, in accordance with one embodiment of the present invention, is illustrated in flow 140 of FIG. 6. Flow 140 begins with block 144 where it is first determined that an access request is currently pending on system bus 20 (otherwise, there is no currently pending access request to retract.) Flow then proceeds to decision diamond 146 where it is determined whether the currently pending access request should be retracted. Therefore, as described above, sequencer control logic 42 may determine that the currently pending access request should be retracted. If not, flow proceeds to block 148 where the system (e.g. data processing system 10) waits for the currently pending access request to be completed. However, if the currently pending access request should be retracted, flow proceeds from decision diamond 146 to block 150 where a retraction request (e.g. retraction request 54) corresponding to the currently pending access request is generated. After block 150, flow proceeds to decision diamond 152 where it is determined whether retraction of the currently pending access request is allowed (e.g. by retraction control logic 50) based on characteristics of the currently pending access request. If, at decision diamond 152, retraction is allowed, flow proceeds to block 156 where the retraction request is allowed (e.g. retraction indicator 62 is asserted) and the currently pending access request is retracted. If, however, retraction is not allowed, flow proceeds to block 154 where the retraction request is denied and the system waits for the currently pending access request to be completed. Therefore, flow 140 may be used whenever a currently pending access request is on system bus 20, where this currently pending access request may be selectively retracted.

Referring back to FIG. 2, in one embodiment, retraction control logic 50 uses access retraction control information stored within access retraction control register 48 to determine whether retraction of the currently pending access request is allowed or not based on characteristics of the currently pending access request. FIGS. 3–5 illustrate various embodiments of access retraction control register 48 which indicate conditions under which retraction is allowed (or, alternatively, conditions under which retraction is disallowed). Referring to the embodiment of FIG. 3, access retraction control register 48 provides control information corresponding to the types of pending accesses, e.g. instruction versus data, read versus write, etc. For example, access retraction control register 48 of FIG. 3 includes three fields: an instruction read retraction control field 100, a data read retraction control field 102, and a data write retraction control field 104. In one embodiment, each field is a single bit, which, when asserted, indicates that retraction of that type of access is allowed. For example, if instruction read retraction control field 100 is asserted and if the currently pending access request is an instruction read type access (indicated, for example, by the attributes corresponding to the currently pending access request where, in one embodiment, pending address 58 is also augmented with attributes), then retraction of the currently pending access request is allowed. However, if instruction read retraction control field 100 were negated, then the retraction would be denied. Therefore, depending on the characteristics of the currently pending access request (e.g. whether the type of access request is a read or write or data or instruction), retraction control logic 50 may allow or deny a retraction request from sequencer control logic 42 using the access retraction control information stored within access retraction control register 48.

In the embodiment of FIG. 3, note that the type of access is used to indicate whether or not to allow retraction, regardless of the device being accessed. For example, if instruction read retraction control field is asserted, retraction is allowed for an instruction read type access, regardless of whether the access is to memory system 14, slave 16, or slave 18. However, in alternate embodiments which will be described below, retraction may be allowed or denied based on the device being accessed (e.g. a specific address range being accessed) in addition to the type of access.

In another alternate embodiment, the fields of FIG. 3 may correspond to characteristics of a new request subsequent to the currently pending request where retraction control logic 50 may allow or deny a retraction request (to retract the currently pending access request) from sequencer control logic 42 using access retraction control information corresponding to the new subsequent request. For example, in this embodiment, if instruction read retraction control field 100 is asserted and if the new access request subsequent to the currently pending access request is an instruction read type access, then retraction of the currently pending access is allowed.

FIG. 4 illustrates another embodiment of access retraction control register 48, which includes a number (e.g. 4) of address range retraction control fields: address range 1 retraction control field 106, address range 2 retraction control field 108, address range 3 retraction control field 110, and address range 4 retraction control field 112. Each retraction control field of FIG. 4 may therefore correspond to a particular address range (where, in alternate embodiments, access retraction control register 48 may include any number of address range retraction control fields). For example, an address range may identify all or a particular range of locations in a memory (such as in memory system 14 of FIG. 1), or may identify all or a particular range of locations within any device coupled to system bus 20, such as within slave 16 or slave 18. For example, in one embodiment, one of the address ranges may correspond to the address range of bus bridge 22 coupled to system bus 20, where the address range may indicate whether retraction is allowed or denied for any device coupled to system bus 30.

Alternatively, one of the address ranges may correspond specifically to a range of locations within any of the devices coupled to system bus 30 (which is coupled via bus bridge 22 to system bus 20).

In one embodiment, the address ranges for each of the address range retraction control fields are defined within address comparison logic such as address comparison logic 60 of FIG. 2. The address ranges may be defined, for example, by using upper and lower bounds or by using a starting location and a mask. Referring to the embodiment of FIG. 2, address comparison logic 60 may therefore compare pending address 58 (corresponding to the currently pending address that sequencer control logic 42 may wish to retract) with each of the defined address ranges to determine which range, if any, pending address 58 falls into. If, for example, pending address 58 falls into address range 2, then address range 2 retraction control field 108 of access retraction control register 48 (of FIG. 4) is used to indicated whether the retraction of pending address 58 is allowed. For example, if it is asserted, retraction is allowed; however, if it is negated, then retraction is denied. If, however, pending address 58 does not fall into any of ranges 1–4 corresponding to the embodiment of FIG. 4, then retraction of pending address 58 is not allowed. In an alternate embodiment, the ranges defined by the address range retraction controls fields may define ranges in which retraction is not allowed, and all other address locations may be retractable.

Note that the embodiments of FIGS. 3 and 4 may be combined such that the determination of whether retraction is allowed or denied is based on both access type and address ranges. For example, in one embodiment, for each address range, a corresponding instruction read, data read, and data write control field (or a subset thereof) may be used to further define when retraction is allowed. For example, referring to FIG. 1, an address range retraction control field may correspond to slave 16, such that if an access request is made to slave 16, then the pending address corresponding to the access request will fall into this range. Furthermore, for the particular address range which corresponds to slave 16, a user may wish to allow retraction for only data reads and writes, and not for instruction reads. In this case, data read, data write, and instruction read retraction control fields specific to the particular address range are used to determine whether the access is allowed. Therefore, any combination of characteristics of the currently pending address may be used to determine if retraction is allowed.

FIG. 5 illustrates yet another embodiment of access control register 48 where retraction is allowed or denied based on a previous access type or based on an order or sequence of access types. For example, in the embodiment of FIG. 5, access retraction control register 48 includes an instruction following instruction (IFI) retraction control field 114, a data read following instruction (DRFI) retraction control field 116, a data write following instruction (DWFI) retraction control field 118, an instruction following data read (IFDR) retraction control field 120, a data read following data read (DRFDR) retraction control field 122, a data write following data read (DWFDR) retraction control field 124, an instruction following data write (IFDW) retraction control field 126, a data read following data write (DRFDW) retraction control field 128, and a data write following data write (DWFDW) retraction control field 129. Therefore, in the embodiment of FIG. 5, retraction is allowed or denied based on the currently pending access and the previous access type. For example, sequencer control logic 42 may keep track of the previous access type, such that when retraction of the currently pending access request (corresponding to pending address 58) is desired, it may be allowed or denied based on the previous access. If, for example, the previous access was a data write, and the currently pending access that is to be retracted is an instruction access (i.e. an instruction read), then IFDW retraction control field 126 is used by retraction control logic 50 to determine if the retraction is allowed. Therefore, if field 126 is asserted, retraction of the currently pending access is allowed; however, if negated, retraction is denied. In another embodiment, the fields described in FIG. 5 may be applied based on the characteristics of the newly requested access as it relates to the characteristics of the currently pending access. For example, if the currently pending access is an instruction read, and the newly requested access is a data write, the DWFI retraction control field 118 may be examined to determine whether retraction of the currently pending instruction access is allowed.

As with the embodiments of FIGS. 3 and 4, the characteristics defined by fields 114–128 in FIG. 5 may be used in combination with other characteristics, such as, for example, those characteristics defined by fields 100–104 of FIG. 3 and/or fields 106–112 of FIG. 4. Furthermore, access retraction control register 48 may include any number of registers (one or more) with any number of fields, as needed. Also, any number of address ranges may be defined, as needed, and their boundaries stored within retraction control logic 50 or elsewhere within master 12. Also, note that the retraction control fields of FIGS. 3–5 were described as single-bit fields which can be either asserted or negated to indicate whether retraction is allowed or denied. However, in alternate embodiments, each field may include any number of bits, as desired, to indicate, allowance of retraction or levels of retraction. Also, any type of storage circuitry may be used to store the access retraction control information stored within access retraction control register 48.

Note also that in alternate embodiments, rather than using characteristics of the currently pending access described in FIGS. 3–5, characteristics of a new access subsequent to the currently pending access request may be used instead in a similar fashion to determine whether access retraction of the currently pending access request is allowed. Therefore, in these alternate embodiments, the information within fields of FIGS. 3–5 would correspond to the new access request rather than the currently pending access request in order to determine whether access retraction of the currently pending access request is allowed. In yet another alternate embodiment, any number of access retraction control registers or fields within the access retraction control register(s) may be used where selective retraction of the currently pending access request may be based on characteristics of both the currently pending access request and the new access request. For example, access retraction control register 48 may include one register or set of registers corresponding to characteristics of the currently pending access address and may include another register or set of registers corresponding to characteristics of the new (i.e. subsequent) access request.

Note that the descriptions provided above were described in reference to a single master system (e.g. data processing system 10 of FIG. 1). However, in an alternate embodiment, data processing system 10 may include multiple bus masters. In this embodiment, the characteristics of a currently pending access used to determine whether retraction is allowed or denied may also include which bus master made the access request. For example, a separate address retraction control register (or set of address retraction control registers), such as those described in reference to FIGS. 3–4, may be used where each register (or set of registers) corresponds to a different bus master. In this embodiment, BIU 70 may also indicate to retraction control logic 50 which bus master made the currently pending access (corresponding to pending address 58). For example, each bus master may have a corresponding unique bus master identifier provided via system bus 20 along with each access request. Also, note that each bus master may have different corresponding access retraction control registers and/or fields, as needed.

Therefore, it can be appreciated that the embodiments described in FIGS. 1–6 allow for selective retraction of the currently pending access based on one or more characteristics of the currently pending access, or one or more characteristics of a new access request subsequent to the currently pending access request, or one or more characteristics of each of the currently pending access request and the new access request. In this manner, bus master 12 may better control its access requests, thus reducing stalls and improving performance. The one or more characteristics may include, for example, type of access (e.g. read/write, instruction/data, burst/non-burst, etc.), sequence or order of access, address being accessed (e.g. which address range is being accessed or which device is being accessed), the bus master requesting retraction (in an, e.g., multimaster system), or any combination thereof. Also, note that the selective retraction described above in reference to FIGS. 1–6 may be performed dynamically on an access-by-access basis. Furthermore, the characteristics of an access may be used to selectively override other aspects of a bus protocol, similar to the selective retraction described above. For example, whether a burst access is fully completed once requested, or whether the burst access may be interrupted prior to completion.

Figure 7:
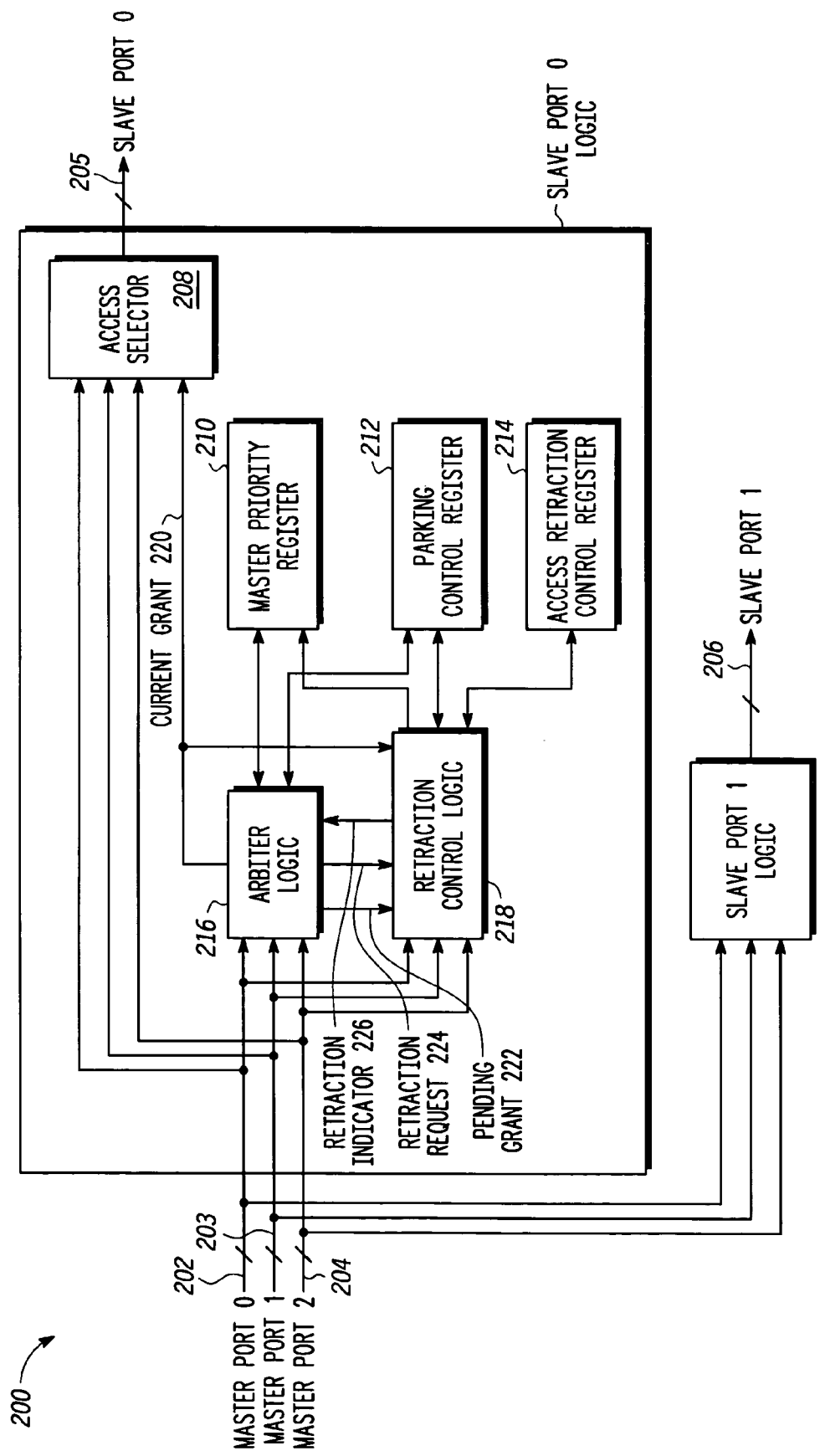
FIG. 7 illustrates, in block diagram form, a system interconnect in accordance with one embodiment of the present invention.

The concepts of access retraction described above in reference to FIGS. 1–6 may also be applied to bus arbiters which may also retract currently pending accesses based one or more characteristics of the currently pending access request (and/or of a new access subsequent to the currently pending access request). For example, FIG. 7 illustrates a system interconnect 200 capable of coupling M masters to N slaves, in accordance with one embodiment of the present invention. For example, in one embodiment, system interconnect 200 is implemented as a crossbar switch. In the illustrated embodiment, each of master ports 0–2 may communicate with each of slave ports 0 and 1. Each master port may have one or more masters coupled to it, and each of the slave ports may have one or more slaves coupled to it. Note that if more than one master or slave is coupled to a particular port, then additional arbitration logic (not shown) may be needed to arbitrate between the multiple masters or slaves coupled to the same master or slave port, respectively. Also, note that the types of masters coupled to the master ports and the types of slaves coupled to the slave ports may be the same types as described above in reference to bus master 12 and slaves 16 and 18. In the embodiments discusses herein, it will be assumed that each master port has a corresponding master coupled to it. For example, although not shown, master port 0 has a master 0 coupled to it, master port 1 has a master 1 coupled to it, and master port 2 has a master 2 coupled to it. Similarly, it will be assumed that each slave port has a corresponding slave coupled to it, where, for example, slave port 0 is coupled to a slave 0 and slave port 1 is coupled to a slave 1.

Also, note that any data processing system, such as data processing system 10, may utilize a system interconnect such as system interconnect 200 in place of the system bus. For example, referring back to FIG. 1, system interconnect 200 may be used in place of system bus 20, where bus master 12 may be coupled to one of master ports 0–2, and slave 16 may be coupled to one of slave port 0 or 1 and slave 18 may be coupled to the other one of slave port 0 or 1. Also, additional masters, such as bus master 12, may be coupled to the remaining two of master ports 0–2. Note also that FIG. 7 illustrates three master ports and two slave ports, but it should be understood that system interconnect 200 may include any number of master ports and any number of slave ports, as needed.

In system interconnect 200 of FIG. 7, it may be desirable to retract access requests from a master to a slave port in favor of a subsequent request. For example, an access request of a master may be in progress (e.g., the address of the current access request may be driven onto the slave port, taken or accepted by the slave, and thus awaiting for the corresponding data to be returned from the slave). However, the return of the data may be delayed, thus increasing the number of wait states required for the completion of the access request in progress. While this access request is in progress and awaiting the return data, the same master or a different master may, provide another access request to the same slave port. This access request may be granted by arbitration logic within the system interconnect, thus becoming a currently pending access request which is driven onto the slave port. However, although it is granted and driven onto the slave port, this currently pending access request cannot be performed by the slave until the access request currently in progress has completed (i.e. the data returned). Therefore, it may be desirable, based on the characteristics of the currently pending access request (and/or the characteristics of a new access request subsequent to the currently pending access request), to retract the currently pending access request in favor of a subsequent access request to the same port if, for example, the subsequent access request has higher priority. The retracted currently pending access request may then be stored within slave port logic corresponding to the slave port until after the subsequent access request is driven onto the slave port. Alternatively, the retracted currently pending access request may be stored until a later point in time when it is then re-driven onto the slave port. In this manner, efficiency may be improved. Further details of access retraction with respect to bus arbitration will be discussed in reference to FIGS. 7–12.

System interconnect 200 of FIG. 7 includes master ports 0–2, slave ports 0 and 1, and slave port 0 logic, and slave port 1 logic, where each of master ports 0–2 are coupled to slave port 0 via slave port 0 logic and each of master ports 0–2 are coupled to slave port 1 via slave port 1 logic. Slave port 0 logic includes arbiter logic 216, retraction control logic 218, master priority register 210, parking control register 212, access retraction control register 214, and access selector 208. Each of master ports 0–2 are coupled, via conductors 202–204, respectively, to access selector 208, arbiter logic 216, and retraction control logic 218 of slave port 0 logic and to slave port 1 logic. Access selector 208 provides the information from one of conductors 202–204 (corresponding to master port 0–2, respectively) to conductors 205 at slave port 0. That is, conductors 205 may also be referred to as a slave bus which is coupled to the corresponding slave, slave 0. Arbiter logic 216 provides current grant 220 to access selector 208 and to retraction control logic 218. Arbiter logic 216 also provides pending grant 222 and retraction request 224 to retraction control logic 218 and receives retraction indicator 226 from retraction control logic 218. Arbiter logic 216 is coupled to master priority register 210 and parking control register 212. Retraction control logic 218 is coupled to master priority register 210, parking control register 212, and access retraction control register 214.

Note that the circuitry within slave port 1 logic is not shown; however, is analogous to the circuitry within slave port 0 logic which will be described in more detail below. That is, operation of slave port 1 logic is analogous to operation of slave port 0 logic.

In operation, slave port 0 logic controls accesses from masters coupled to master ports 0–2 to slave port 0. Arbiter logic 216 receives access requests to slave port 0 via conductors 202–204 and determines which ones to grant and when. Arbiter logic 216 then provides current grant 220 to access selector 208 which is a control signal that indicates which access request has been granted. Access selector 208, based on current grant 220, provides the information from the granted access request from one of master ports 0–2 to slave port 0, thus driving the address, data, and control signals from the master whose access request is currently granted to conductors 205, coupled to slave 0. In making the decision of which access request to grant, arbiter logic 216 may use master priority register 210 and parking control registers 212. After driving the information from the master whose access request is currently granted to conductors 205, slave 0 takes or accepts the access request. Slave 0, upon taking the access request, receives and stores the address corresponding to the currently granted access request in order to provide or receive the requested data corresponding to the access request. Once the access request is taken, it becomes the access request currently in progress.

Subsequently, arbiter logic 216 may grant a new access request by providing current grant 220 to access selector 208 corresponding to the new access request. The information corresponding to this new access request (from one of master 0–2), is then driven by access selector 208 to conductors 205, coupled to slave 0. However, this new access request remains the currently pending access request while the previously granted access request is still in progress. That is, in the illustrated embodiment, the new access request cannot be taken or performed by slave 0 until the previously granted access request still in progress completes. In one embodiment, the previously granted access request is completed after the data corresponding to the address of the access request is received by slave 0 or provided to masters 0–2 (where the requesting master of masters 0–2 accepts the data).

Since the previously granted access request may be in progress for an unknown period of time, arbiter logic 216 may decide that the currently pending access request (the one waiting for completion of the previously granted access request) should be retracted in favor of a subsequent access request. In this case, arbiter logic 216 requests retraction of the currently pending access request by asserting retraction request 224. Retraction control logic 218, using information from access retraction control registers 214, determines whether retraction of the currently pending access request is allowed based on at least one or more characteristic of the currently pending access request and/or the subsequent access request (where the one or more characteristic can be determined from the information provided via conductors 202–204 from the requesting master, the address of the currently pending access request provided via pending grant 222, and/or from information in master priority register 210 and parking control registers 212). If retraction control logic 218 determines that retraction of the currently pending access is allowed, it asserts retraction indicator 226, and if retraction is not allowed, then retraction indicator 226 is negated (or remains negated). If retraction is allowed, then arbiter logic, via current grant 220 and access selector 208, may replace the currently pending access request on conductor 205 at slave port 0 with the new subsequent access request. Arbiter logic 216 may then store the currently pending access request which was retracted so that after the new subsequent access request is driven onto conductors 205, the retracted request may be re-driven. Alternatively, it may be re-driven at a later point in time.

In the illustrated embodiment of FIG. 7, slave port 0 logic includes master priority register 210 and parking control register 212. Examples of these registers are illustrated in FIGS. 8 and 9, respectively. For example, FIG. 8 illustrates one embodiment of master priority register 210 which includes a master priority field corresponding to each master port: a master 0 priority field 230, a master 1 priority field 232, and a master 2 priority field 234. Each field can therefore include the priority of the corresponding master port. For example, in the illustrated embodiment which includes 3 master ports, a 2-bit value (e.g. 11, 10, 01, 00) may be used to indicate the priorities, where the highest priority master port may be assigned a priority of 11, the second highest a priority of 10, and the third highest (i.e. the lowest of the 3) a priority of 01. In this case, the 00 value may not be used. Alternatively, the priorities may be numbered from 10 (highest priority master port) to 00' (lowest priority master port) where the value 11 may not be used. In yet another alternate embodiment, the priorities may be numbered 10 (lowest priority master port) to 00 (highest priority master port). Alternatively, other schemes may be used to assign a priority to each port. Also, note that, in one embodiment, if a master port does not have a master coupled to it, the corresponding master priority field may be programmed with a predetermined value to indicate this, or may simply be given the lowest priority.

FIG. 9 illustrates one embodiment of parking control register 212 which includes a parking enable field 236 and a parking master field 238. In one embodiment, parking enable field 236 is a one-bit field which, when asserted, indicates that parking is enabled for the corresponding slave port (slave port 0 in this embodiment) and when negated, indicates that parking is not enabled for the corresponding slave port. If parking is enabled, the parking master is provided by the value in parking master field 238. For example, parking master field 238 may be a 2-bit value which identifies one of master ports 0–2. If parking is enabled and the corresponding slave port is idle (not communicating information to or from any master ports), the slave port is automatically coupled to the parking master so that the parking master may communicate with the slave port without requiring an arbitration interval. For example, if slave port 0 is idle, arbiter logic 216, using the information within parking control register 212, provides current grant 220 (indicating the parking master) to access selector 208 which couples the parking master port to conductors 205 of slave port 0. In this case, note that the parking master does not need to explicitly request access to the slave port when the slave port is idle (assuming parking is enabled). In this manner, if the parked master is the next requestor of slave port 0, no arbitration interval is required, and latency of accessing slave port 0 is reduced for the parked master. If parking is not enabled, then arbiter logic 216 and access selector 208 operate as described above in reference to FIG. 7.

Figure 12:
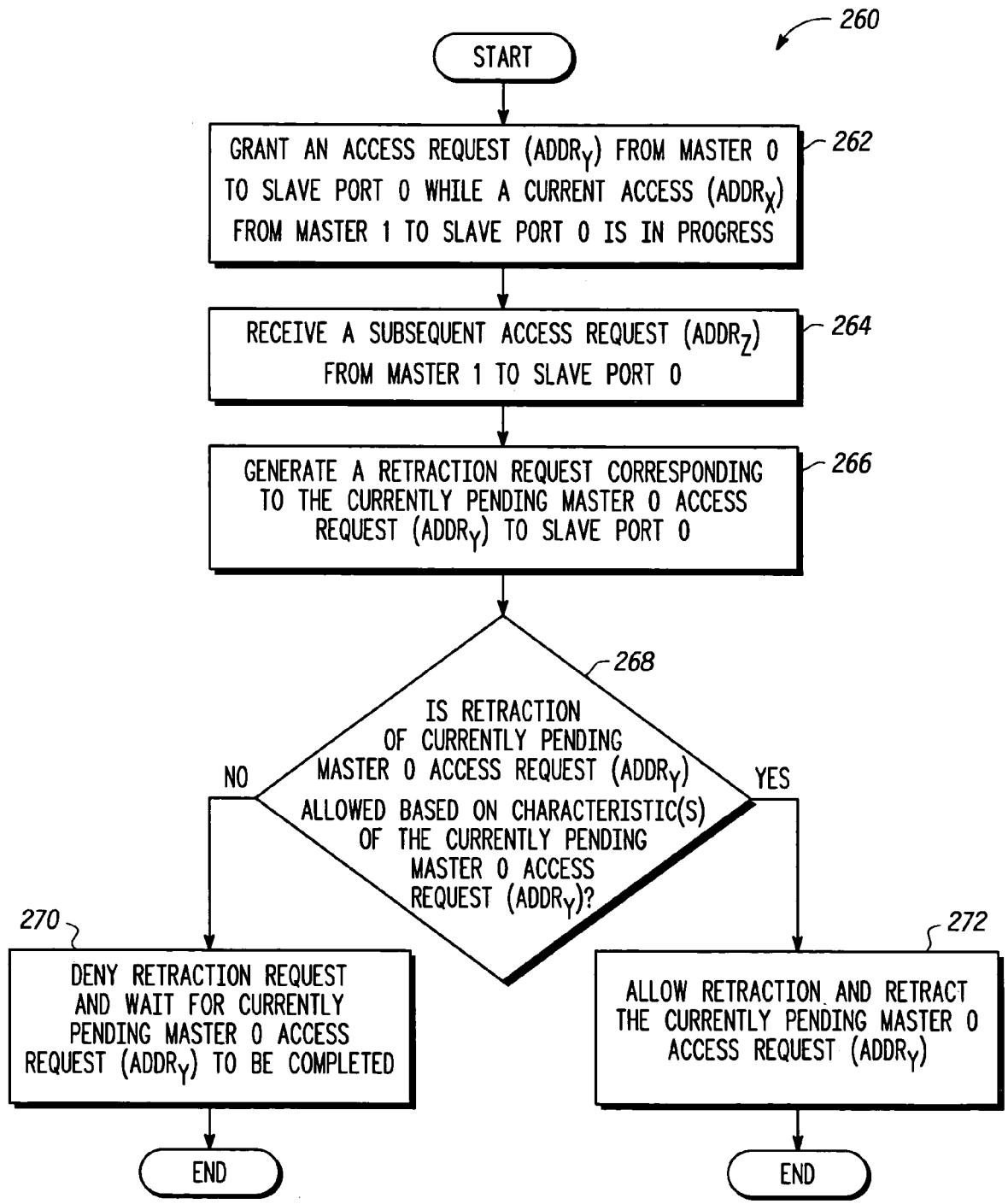
FIG. 12 illustrates, in flow diagram form, an example of performing selective access retraction in accordance with an alternate embodiment of the present invention.

Operation of slave port 0 logic may be further understood in reference to the example provided in flow 260 of FIG. 12. Flow begins with block 262 in which an access request from master 0 to slave port 0 is granted (having a corresponding access address addr$_y$) while a current access request (having a corresponding access address addr$_x$) from master 1 to slave port 0 is in progress. Therefore, as was described in reference to FIG. 7 above, note that the access request from master 0 becomes the currently pending access request which cannot be accepted or taken by slave 0 until the current access in progress from master 1 completes. Flow then proceeds to block 264 in which a subsequent or new access request (having corresponding access address addr$_z$) is received from master 1 (or, in alternate embodiments, from any other master) to slave port 0. As described above, since it may be unknown how long the current access request which is in progress (addr$_x$), arbiter logic 216 may wish to retract the currently pending access request (addr$_y$) in favor of the newly received access request (addr$_z$) because, for example, the newly received access request may be more important or be more time critical. That is, arbiter logic 216 may wish to reorder the pending access requests in favor of subsequently received access requests. Therefore, referring back to FIG. 12, flow proceeds to block 266 where a retraction request corresponding to the currently pending master 0 access request (addr$_y$) to slave port 0 is generated. For example, this may correspond to arbiter logic 216 asserting retraction request 224 as was described in reference to FIG. 7.

Referring back FIG. 12, after the retraction request is generated, flow proceeds from block 266 to decision diamond 268 where it is determined if retraction of the currently pending master 0 access request (addr$_y$) is allowed based on one or more characteristics of the currently pending access request (and/or one or more characteristics of the subsequent access request (addr$_z$)). For example, this determination may be made by retraction control logic 218 using information from master priority register 210, parking control register 212, pending grant 222, information from conductors 202–204, or any combination thereof, and access retraction control register 214. If retraction is not allowed, flow proceeds from decision diamond 268 to block 270 where the retraction request is denied (by negating, for example, retraction indicator 226) and slave port 0 logic waits for the access request in progress (addr$_x$) to complete and for the currently pending access request (addr$_y$) to be taken (thus becoming the new access request in progress) before driving the subsequently received access request (addr$_z$) onto conductors 205 of slave port 0. If retraction is allowed, flow proceeds from decision diamond 268 to block 272 where the currently pending access request (addr$_y$) is retracted (by asserting, for example, retraction indicator 226). In this case, the currently pending access request (addr$_y$) is replaced with the new access request (addr$_z$) such that the new access request (addr$_z$) becomes the currently pending access request. In this manner, the ordering of granted access requests may be reordered from the perspective of the arbiter logic by replacing the previously pending access request (addr$_y$) with the new access request (addr$_z$), where the replaced access request (addr$_y$) may be stored within slave port 0 logic such that it may be redriven onto slave port 0 after addr$_z$ or at some later point in time. From the perspective of a slave 0 coupled to slave port 0, the currently pending access request (addr$_y$) was retracted and a new currently pending access request (addr$_z$) was driven instead, to be taken by the slave after completion of the access request currently in progress (addr$_x$).

As described above, the information within access retraction control register 214 indicates conditions under which retraction is allowed. (Alternatively, access retraction control register 214 indicate conditions under which retraction is disallowed.) Therefore, the information in access retraction control register 214 is used to selectively retract a currently pending access request based on one or more characteristics of the currently pending access request (or of a subsequent access request). These characteristics may include any of those characteristics described above in reference to FIGS. 3–5, or any of the characteristics which will be described in reference to FIGS. 10 and 11, or any combination thereof. For example, as described above, the characteristics of the currently pending access request used to make the determination may include access type, address ranges, data type ordering, and combinations thereof. For example, with respect to address ranges, one or more address ranges may be used to identify a particular slave port (such as slave port 0), or may be used to identify a range of locations accessed via a particular slave port. In this case, as was also described above in reference to FIG. 4, retractions may be allowed or denied simply based on the particular address range (e.g. slave port) being accessed by a currently pending or subsequently received access request, or retractions may be allowed or denied based on the particular address range (e.g. slave port) being accessed as well as on additional characteristics of the currently pending or subsequently received access request. In one embodiment, note that the address ranges may instead be directly identified as particular slave ports.

FIG. 10 illustrates one embodiment of access retraction control register 214 of FIG. 7 in which the determination of whether retraction is allowed or denied is based on priorities (e.g. priority deltas) of the requesting masters. For example, if the master (e.g. master 0 in the example of FIG. 12) which made the subsequent access request (addr$_z$) has a higher priority than the master (e.g. master 1 in the example of FIG. 12) which made the currently pending access request (addr$_y$), then retraction control logic 218 may allow the access retraction (using the information provided by access retraction control register 214 of FIG. 10). For example, access retraction control register 214 of FIG. 10 includes one priority delta retraction control field per master port: master 0 priority delta retraction control field 240, master 1 priority delta retraction control field 242, and master 2 priority delta retraction control field 244. In this example, each field indicates what the priority delta (i.e. the difference in priority) must be between the requesting master of the subsequent access request and the requesting master of the currently pending access request in order for retraction to be allowed. That is, master 0 priority delta retraction control field 240 indicates what priority delta master 0 (if requesting the subsequent access request) must have with respect to the requesting master of the currently pending access request in order for retraction of the currently pending access request to be allowed.

In one embodiment, each field may be a 2-bit value where a value of "00" indicates that a priority delta of greater or equal to 0 is needed, a value of "01" indicates that a priority delta of greater than or equal to one is needed, a value of "10" indicates that a priority delta of greater than or equal to two is needed, and a value of "11" indicates that regardless of the priority delta, retraction in this case is not allowed. Note that other n-bit values may be used (where the n may be any integer greater than 0) to indicate priority deltas required for retraction to be allowed. For example, referring to the example of FIG. 12, master 0 made the currently pending access request (addr$_y$) and master 1 made the subsequent access request (addr$_z$); therefore, if retraction is requested, the information provided in master 0 priority delta retraction control field 240 is used, along with master 0 priority field 230 and master 1 priority field 232 (described in reference to FIG. 8) to determine if retraction is allowed. If the priority delta between master 1 and master 0 (where the priority delta=master 1 priority−master 0 priority) is sufficient as indicated by master 0 priority delta retraction control field 240, then retraction is allowed. If the priority delta is 1 yet master 0 priority delta retraction control field 240 indicates that a delta of greater than or equal to 2 is needed, then retraction is not allowed. However, if the priority delta were 2, retraction would be allowed. If master 0 priority delta retraction control field 240 indicates that a delta of greater than or equal to 0, then as long as master 1 has at least the same priority as master 0, retraction is allowed.

FIG. 11 illustrates another embodiment of access retraction control register 214 of FIG. 7 having a variety of different fields including a highest priority master retraction control field 246, a delay retraction control field 248, a parking master retraction control field 250, and a non-parking master(s) retraction control field 252. In one embodiment, each of fields 246, 250, and 252 is a one-bit field which may be either asserted or negated. For example, if highest priority master retraction control field 246 is asserted, then retraction of a currently pending access request is allowed when the subsequent request is from the master with the highest priority. If parking master retraction control field 250 is asserted, then retraction of a currently pending access request is allowed when the subsequent request is from the parking master (indicated, for example, by parking master field 238 in parking control register 212). If non-parking master(s) retraction control field 252 is asserted, then retraction of a currently pending access request is allowed when the subsequent request is from any non-parking master (any master other than the master indicated by parking master field 238). Delay retraction control field 248 may be used to provide a delay (d) such that retraction, if allowed, is performed after d clocks of wait state, where d can be any integer greater than or equal to 0. For example, in one embodiment, if d is zero, then delay retraction is not enabled; however, if d is one or greater, then the retraction of the currently pending access request (if allowed) is delayed by d clocks. In an alternate embodiment, the delay value may provide a delay (d) such that if retraction is allowed, it is only actually performed when the time it takes the access currently in progress (e.g. corresponding to addr$_x$) to complete is greater than or equal to the delay. That is, in this alternate embodiment, if the access request currently in progress will complete in less than the delay (d), then retraction will not occur, even if it was otherwise allowed. In an alternate embodiment, the delay value may be compared in an alternative manner to the length of time required to complete the access currently in progress, in order to determine whether retraction will occur. That is, in one embodiment, retraction of the currently pending access (if allowed) only occurs if a comparison of the delay value with a time it takes for the access request currently in progress to complete results in a predetermined outcome.

Note that each of the characteristics defined by fields 240–252 in FIGS. 10 and 11 may be used alone or in any combination and may further be used in combination with other characteristics, such as, for example, those characteristics defined by fields 100–104 of FIG. 3 and/or fields 106–112 of FIG. 4 and/or fields 114–128 of FIG. 5. Furthermore, access retraction control register 214 may include any number of registers (one or more) with any number of fields, as needed. Also, note that the retraction control fields of FIGS. 10 and 11 may include any number of bits, as desired, to indicate, allowance of retraction or levels of retraction. Also, any type of storage circuitry may be used to store the access retraction control information stored within access retraction control register 214.

Therefore, it can be appreciated how an arbiter may selectively retract a currently pending access request using characteristics of the currently pending access request or of a subsequent access request or of both the currently pending access request and subsequent access request. In this manner, efficiency may be improved by reducing latency and allowing accesses of higher priority or importance to be taken earlier.

Note that although FIGS. 1, 2, and 7 illustrate the use of bidirectional and unidirectional conductors, it should be understood that different combinations of unidirectional and bidirectional conductors may be used instead. For example, multiple unidirectional conductors may be used instead of a bidirectional conductor. Alternatively, bidirectional conductors may used instead of unidirectional conductors. Signals may also be transferred serially via a single conductor or in parallel via a plurality of conductors. Alternatively, signals may be time multiplexed on a single or a plurality of conductors.

In the foregoing specification, the invention has been described with reference to specific embodiments. However, one of ordinary skill in the art appreciates that various modifications and changes can be made without departing from the scope of the present invention as set forth in the claims below. For example, it should be understood that data processing system 10 could be any type of data processing system which can be located on a single chip or integrated circuit (IC) or a combination of chips or ICs. Also, system interconnect 200 can be located on a same chip or (IC) as the masters and slaves or may be located on a separate IC from the masters and slaves. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for access retraction in a data processing system having a bus master and a system bus, the bus master coupled to the system bus, the method comprising:
   storing access retraction control information which indicates at least one condition under which retraction is allowed or disallowed;
   requesting retraction of a currently pending access request on the system bus; and
   in response to the requesting, using the access retraction control information to selectively retract the currently pending access request based on at least one characteristic of the currently pending access request.

2. The method of claim 1, wherein the requesting retraction is performed based on an instruction currently being decoded.

3. The method of claim 2, wherein retraction is requested if the instruction currently being decoded causes a change of flow.

4. The method of claim 1, wherein the at least one characteristic comprises a type of access of the currently pending access request.

5. The method of claim 4, wherein the type of access is one of a read or write access.

6. The method of claim 4, wherein the type of access is one of an instruction or data access.

7. The method of claim 4, wherein the type of access is one of a burst or non-burst access.

8. The method of claim 4, wherein the selectively retracting is based on the type of access of the currently pending access request and on a type of access of at least one previous access request.

9. The method of claim 1, wherein the data processing system comprises a second bus master coupled to the system bus, and wherein the at least one characteristic comprises which bus master requested the currently pending access request.

10. The method of claim 1, wherein the access request has a corresponding access address, and wherein the at least one characteristic comprises an address range into which the access address falls.

11. The method of claim 10, wherein the access retraction control information indicates at least one condition under which retraction is allowed or disallowed for a corresponding address range, wherein selectively retraction comprises determining if the access address falls within the corresponding address range.

12. The method of claim 1, wherein if the access retraction control information indicates retraction of the currently pending access request is allowed based on the at least one characteristic, the selectively retracting further comprises:
   retracting the currently pending access request by providing a dummy value in response to the currently pending access request.

13. The method of claim 1, wherein if the access retraction control information indicates retraction of the currently pending access request is allowed based on the at least one characteristic, the selectively retracting further comprises:
   retracting the currently pending access request by replacing the currently pending access request on the system bus with a new access request.

14. A method for access retraction in a data processing system having a bus master and a system bus, the bus master coupled to the system bus, the method comprising:
   storing access retraction control information corresponding to an address range, wherein the access retraction control information indicates whether retraction is allowed or disallowed for the corresponding address range;
   requesting retraction of a currently pending access request on the system bus, wherein the currently pending access request has a corresponding address;
   determining whether the corresponding address falls within the address range; and
   selectively retracting the currently pending access request based on the access retraction control information if the corresponding address falls within the address range.

15. The method of claim 14, wherein the requesting retraction is performed based on an instruction currently being decoded.

16. The method of claim 15, wherein retraction is requested if the instruction currently being decoded causes a change of flow.

17. The method of claim 14, wherein the access retraction control information corresponding to the address range indicates whether retraction is allowed or disallowed for the corresponding address range by indicating at least one condition under which retraction of the currently pending access request is allowed or disallowed when the corresponding address falls within the address range.

18. The method of claim 17, wherein the selectively retracting the currently pending access request based on the access retraction control information if the corresponding address falls within the address range comprises:
   selectively retracting the currently pending access request based on the access retraction control information and at least one characteristic of the currently pending access request if the corresponding address falls within the address range.

19. The method of claim 18, wherein the at least one characteristic comprises a type of access of the currently pending access request.

20. The method of claim 19, wherein the type of access is one of a read or write access.

21. The method of claim 19, wherein the type of access is one of an instruction or data access.

22. The method of claim 19, wherein the type of access is one of a burst or non-burst access.

23. The method of claim 19, wherein the selectively retracting the currently pending access request based on the access retraction control information and the at least one characteristic of the currently pending access request if the corresponding address falls within the address range comprises:
   selectively retracting the currently pending access request based on the access retraction control information, the type of access of the currently pending access request, and a type of access of a previous access request, if the corresponding address falls within the address range.

24. The method of claim 18, wherein the data processing system comprises a second bus master coupled to the system bus, and wherein the at least one characteristic comprises which bus master requested the currently pending access request.

25. The method of claim 14, wherein if the corresponding address falls within the address range and the access retraction control information indicates retraction is allowed, the selectively retracting comprises:
   retracting the currently pending access request by providing a dummy value in response to the currently pending access request.

26. The method of claim 14, wherein if the corresponding address falls within the address range and the access retraction control information indicates retraction is allowed, the selectively retracting comprises:
   retracting the currently pending access request by replacing the currently pending access request with a new access request.

27. The method of claim 14, wherein:
   the storing the access control information corresponding to the address range comprises storing access control information corresponding to each of a plurality of address ranges, wherein the access control information indicates whether retraction is allowed for each of the plurality of address ranges;
   the determining whether the corresponding address falls within the address range comprises determining whether the corresponding address falls within one of the plurality of address ranges; and the selectively retracting comprises selectively retracting the currently pending access request based on the access retraction control information corresponding to the one of the plurality of address ranges if the corresponding address falls within the one of the plurality of address ranges.

28. The method of claim 27, wherein the access retraction control information corresponding to each of the plurality of address ranges indicates whether retraction is allowed or disallowed for each of the plurality of address ranges by indicating at least one condition under which retraction of the currently pending access request is allowed or disallowed when the corresponding address falls within one of the plurality of address ranges, and wherein the selectively retracting further comprises:

selectively retracting the currently pending access request based on the access retraction control information corresponding to the one of the plurality of address ranges and at least one characteristic of the currently pending access request if the corresponding address falls within the one of the plurality of address ranges.

29. A data processing system, comprising:

a system bus; and a bus master coupled to the system bus, wherein the bus master requests retraction of a currently pending access request on the system bus, the bus master comprising retraction control logic and access retraction control storage circuitry, the access retraction control storage circuitry storing access retraction control information, and the retraction control logic using the access retraction control information to selectively retract the currently pending access request based on at least one characteristic of the currently pending access request.

30. The data processing system of claim 29, wherein the bus master further comprises sequencer control logic coupled to an instruction decoder, wherein the sequencer control logic generates a retraction request for the currently pending access request based on an instruction being decoded by the instruction decoder.

31. The data processing system of claim 30, wherein the bus master further comprises a bus interface unit coupled to the system bus, and wherein if the access retraction control information indicates that retraction is allowed for the currently pending access request based on the at least one characteristic of the currently pending access request, the bus interface unit provides a dummy value in response to the currently pending access request to the retraction control logic.

32. The data processing system of claim 30, wherein the bus master further comprises a bus interface unit coupled to the system bus, and wherein if the access retraction control information indicates that retraction is allowed for the currently pending access request based on the at least one characteristic of the currently pending access request, the bus interface unit replaces the currently pending access request with a new access request.

33. The data processing system of claim 30, wherein the retraction control logic further comprises address comparison logic which determines whether a corresponding address of the currently pending access request falls within a predetermined address range, and wherein, if the corresponding address falls within the predetermined address range, the retraction control logic uses access retraction control information corresponding to the predetermined address range to selectively retract the currently pending access request.

34. The data processing system of claim 29, wherein the at least one characteristic comprises a type of access of the currently pending access request.

35. The data processing system of claim 34, wherein the retraction control logic uses the access retraction control information to selectively retract the currently pending access request based on the type of access of the currently pending access request and on a type of access of a previous access request.

36. The data processing system of claim 29, further comprising a second bus master coupled to the system bus, and wherein the at least one characteristic comprises which bus master requested the currently pending access request.

37. A method for access retraction in a data processing system having a bus master and a system bus, the bus master coupled to the system bus, the method comprising:

storing access retraction control information which indicates at least one condition under which retraction is allowed or disallowed;

receiving a subsequent access request;

requesting retraction of a currently pending access request on the system bus, wherein the subsequent access request is received from the master after the currently pending access request was received from the master; and in response to the requesting, using the access retraction control information to selectively retract the currently pending access request based on at least one characteristic of the subsequent access request.

38. The method of claim 37, wherein the at least one characteristic comprises a type of access of the currently pending access request.

39. The method of claim 37, wherein the selectively retracting is based on at least one characteristic of each of the currently pending access request and the subsequent access request.

40. The method of claim 37, wherein the subsequent access request has a corresponding access address, and wherein the at least one characteristic comprises an address range into which the access address falls.

41. The method of claim 40, wherein the access retraction control information indicates at least one condition under which retraction is allowed or disallowed for a corresponding address range, wherein selectively retracting the currently pending access comprises determining if the access address of the subsequent access request falls within the corresponding address range.

* * * * *